United States Patent [19]
Coirier et al.

[11] Patent Number: 5,675,328
[45] Date of Patent: Oct. 7, 1997

[54] OPTOELECTRONIC DEVICE FOR ASSISTANCE IN THE PILOTING OF AN AIRCRAFT UNDER CONDITIONS OF POOR VISIBILITY

[75] Inventors: Philippe Coirier, Merignac; Alain Goujon, Martignas sur Jalle; Alain Leger, Merignac, all of France

[73] Assignee: Sextant Avionique, Velizy Villacoublay, France

[21] Appl. No.: 630,254

[22] Filed: Apr. 10, 1996

[30] Foreign Application Priority Data

Apr. 13, 1995 [FR] France ................... 95 04458

[51] Int. Cl.⁶ ............................................. G01C 23/00
[52] U.S. Cl. ........................ 340/975; 340/974; 340/980
[58] Field of Search ............................. 340/971, 973, 340/974, 975, 976, 980; 345/7

[56] References Cited

U.S. PATENT DOCUMENTS

| | | | |
|---|---|---|---|
| 3,824,535 | 7/1974 | Rover, Jr. ................... | 340/975 |
| 4,121,246 | 10/1978 | Fadden et al. ............... | 340/973 |
| 4,305,057 | 12/1981 | Rolston ...................... | 340/974 |
| 4,910,513 | 3/1990 | Kelly et al. ................. | 340/974 |
| 5,248,968 | 9/1993 | Kelley et al. ................ | 340/975 |

FOREIGN PATENT DOCUMENTS

| | | |
|---|---|---|
| 0 044 777 | 1/1982 | European Pat. Off. . |
| WO 92/01906 | 2/1992 | WIPO . |

*Primary Examiner*—Brent A. Swarthout
*Attorney, Agent, or Firm*—Oblon, Spivak, McClelland, Maier & Neustadt, P.C.

[57] ABSTRACT

An optoelectronic device designed to facilitate the piloting of an aircraft under conditions of poor visibility, at take-off and in the event of an interruption of approach procedures through a wave-off maneuver. It consists of a collimator displaying, in addition to the artificial skyline, the aircraft model and the ground speed vector, two take-off and wave-off slope scales inclined symmetrically along the arms of an X laid on the artificial skyline and intersecting at a value of pitch attitude called a safety pitch attitude to be maintained in the event of engine failure, a local horizon locked into the aircraft model and two pointers that identify the safety pitch attitude and frame the artificial skyline when the pitch attitude of the aircraft corresponds to the safety pitch attitude. Through these new graphic symbols, the pilot can examine the pitch attitude of the aircraft and its roll attitude without taking his eyes off the aircraft model. This makes it easier for him to pilot the aircraft at take-off and during wave-off maneuvers with or without engine failure.

10 Claims, 4 Drawing Sheets

OPTOELECTRONIC DEVICE FOR ASSISTANCE IN THE PILOTING OF AN AIRCRAFT UNDER CONDITIONS OF POOR VISIBILITY

BACKGROUND OF THE DESCRIPTION

1. Field of the Invention

The present invention relates to optoelectronic devices for assistance in the piloting of aircraft, that can be used under conditions of poor visibility, at take-off and in the event of an interruption of approach procedures through a wave-off maneuver.

2. Description of the Prior Art

Optoelectronic devices for assistance in the piloting of an aircraft consist of collimators or head-up displays showing graphic and alphanumeric information before the eyes of an aircraft pilot or helicopter pilot. The information is projected on a semi-reflective, optical device superimposed on the view of the outside world. The view of the external world may be either direct or may make use of a sensor by giving a video image presented in the collimator.

The performance characteristics obtained with these optoelectronic devices for assistance in piloting depend directly on the visual characteristics of the various symbols shown to the pilot, in terms of both capacity for comprehensive monitoring of the situation and precision of the maneuvers performed manually.

The parameters commonly shown in the collimators may be classified in different groups:

- information from the "basic Tee" of the instrument panel (pertaining to attitude, heading, speed, altitude),
- information close to that provided by the "basic Tee" (pertaining to Mach number, rate of climb given by the rate-of-climb indicator, altitude given by the radio altimeter),
- information related to the trajectory (rate of climb, acceleration, total slope),
- zone radio-navigation information (RNAV) using the VOR, ILS and DME systems,
- guidance information (in terms of attitude and trajectory),
- complementary situation control information (explicit instructions pertaining to course, heading, etc., deviation from set values of speed, etc., indications of operating methods, various alarms, etc.).

In the field of civil aviation, collimators are used chiefly for the stages of landing flight, taxiing and take-off in conditions of poor visibility. They enable a reduction of the minimum operational levels of visibility and/or increase the safety of operations through an enhanced capacity to monitor the situation. Similarly, they provide greater precision of control of the trajectory when flying by sight.

SUMMARY OF THE INVENTION

The present invention is aimed at improving the performance characteristics of a collimator used in the initial climbing stage at take-off or in the event of an interruption of approach procedures by a wave-off maneuver, in order to increase the level of monitoring of the situation in general and the precision with which the trajectory is followed in particular (in terms of course and slope) even in the event of engine failure.

An object of the invention is an optoelectronic device for assistance in the piloting of an aircraft provided with a navigation data generator defining, inter alia, the pitch and roll attitudes and a collimator displaying an artificial skyline giving a roll attitude reference and a zero slope and a fixed symbol constituted by an aircraft model giving a longitudinal reference of the aircraft. This device is noteworthy in that it comprises means for the display, on the collimator, of two take-off and wave-off slope scales, inclined symmetrically along the arms of an X laid on the artificial skyline and intersecting at a value of pitch attitude called a safety pitch attitude to be maintained in the event of engine failure. Advantageously, the two take-of and wave-off slope scales are graduated every 2.5° and extend over 20° of slope above the artificial skyline.

Advantageously, the optoelectronic device for piloting assistance also has means for the display, on the collimator, of a local horizon locked into the fixed symbol of the aircraft model. Advantageously, the local horizon linked to the fixed symbol of the aircraft model is formed by two straight segments that are aligned and symmetrical with respect to the center of the aircraft model and that tilt so as to remain parallel to the artificial skyline.

Advantageously, the optoelectronic device for piloting assistance has means for the display, on the collimator, of two pointers that identify the safety pitch attitude and are fixedly joined and parallel to the artificial skyline, positioned on each side of the fixed symbol of the aircraft model at the level of the safety pitch attitude and designed to get positioned on the local horizon when the pitch attitude of the aircraft is the same as the safety pitch attitude. Advantageously, the two indicators identifying the safety pitch attitude are spaced out laterally by the length of the two straight segments of the local horizon.

BRIEF DESCRIPTION OF THE DRAWINGS

Other features and advantages of the invention shall appear from the following description of an exemplary embodiment. The description shall be made with reference to the appended drawings, wherein.

MORE DETAILED DESCRIPTION

Figure 1:
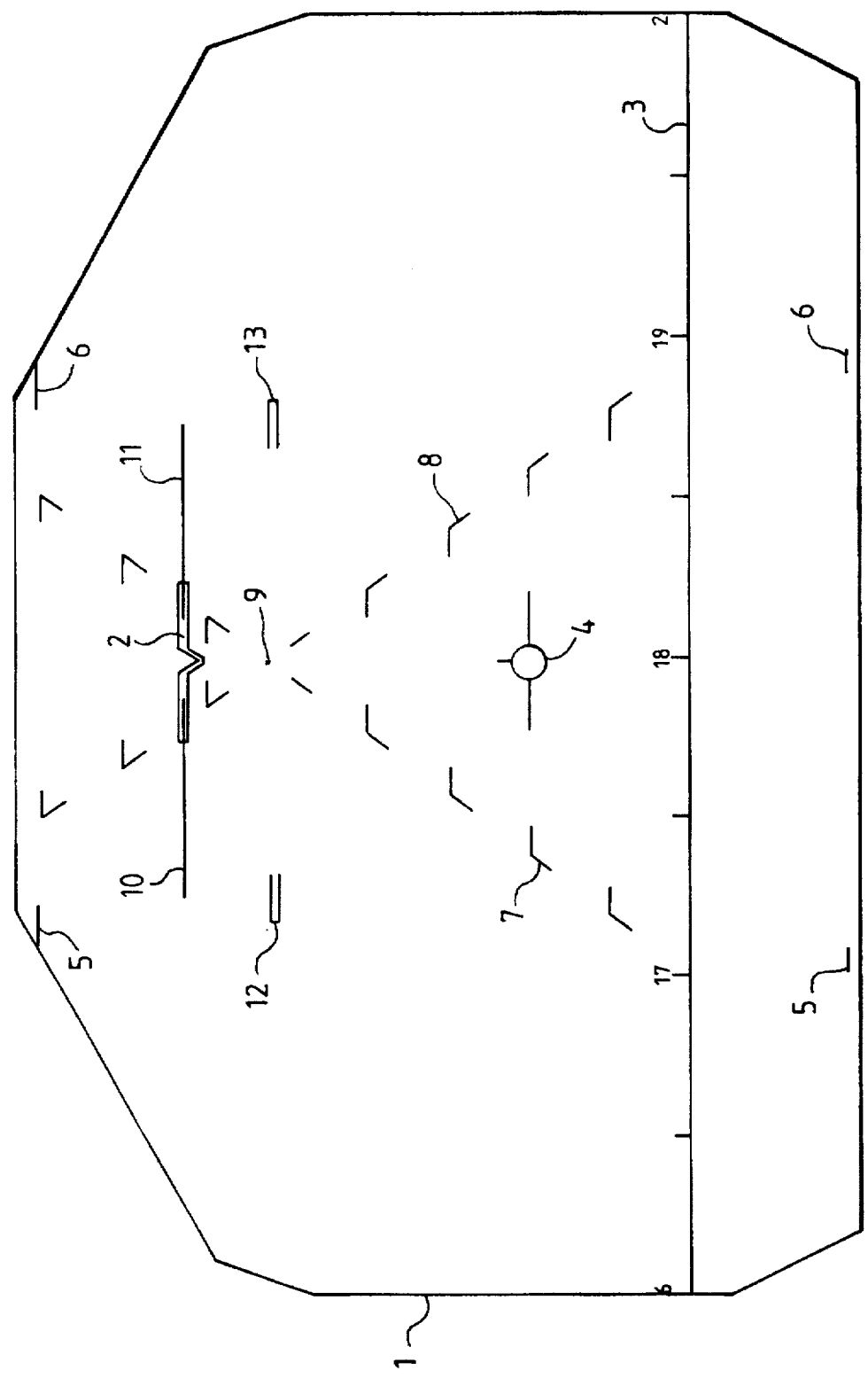
FIGS. 1, 2 and 3 are views of collimator screens on which there appear different graphic symbols including those displayed by a device according to the invention, under different conditions of flight of an aircraft.
Figure 2:
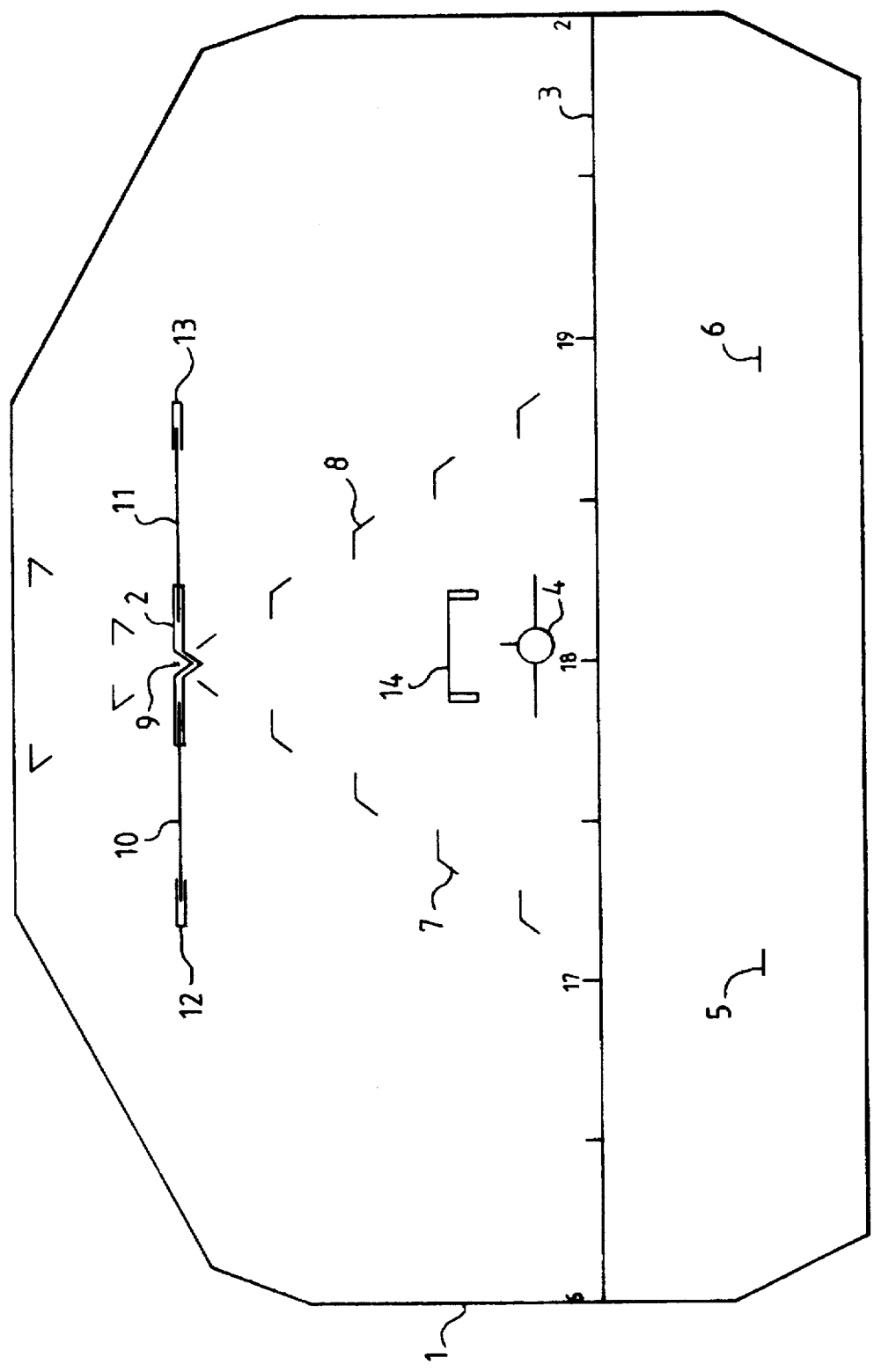
Figure 3:
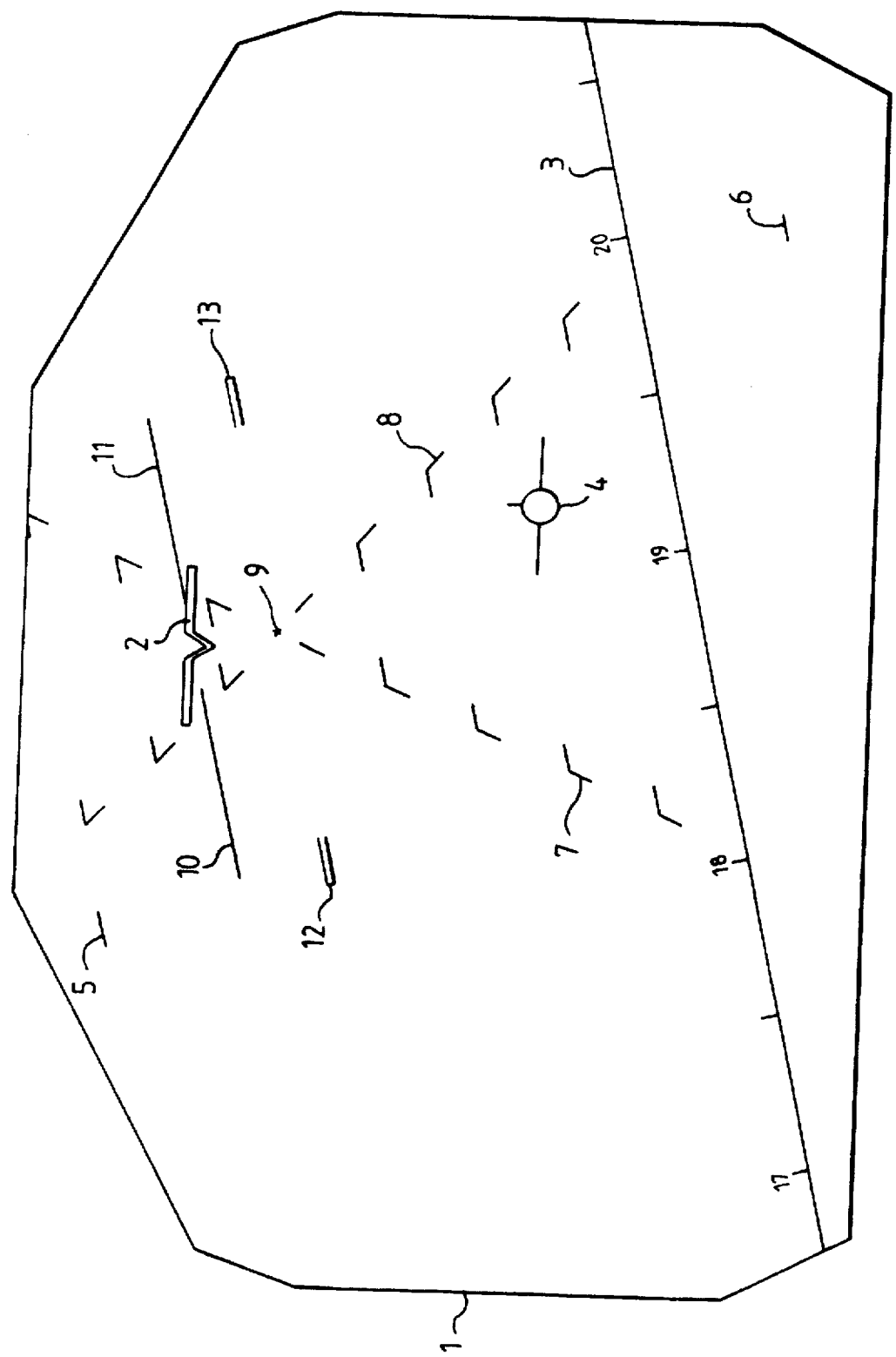

A collimator takes the form of a transparent screen 1 through which the pilot looks at the exterior. On this transparent screen 1, there are projected different alphanumeric and graphic symbols designed to facilitate the task of piloting. For clarity's sake, the alphanumeric symbols are not shown in FIGS. 1, 2 and 3 which shows only graphic symbols that are either usual symbols or symbols coming a display device according to the invention. Among the usual symbols, there is a fixed aircraft model 2 showing the longitudinal reference axis of the fuselage of the aircraft, a mobile artificial skyline 3, graduated in terms of heading scale, that shifts under the indications of the navigation system, a mobile winged circle 4 representing the end of the ground speed vector of the aircraft, namely the direction of the tangent to its trajectory, and two vertical slope scales 5 and 6 that are drawn on each side of the aircraft model 2 perpendicularly to the artificial skyline 3 and formed by horizontal dashes positioned one on top of the other and spaced out at intervals of 5° in terms of slope. In FIGS. 1, 2, and 3, the two vertical slope scales 5 and 6 have been removed in a range of 0° to 20° of positive slope to make place for more expressive graphic symbols projected by the display device according to the invention. These symbols are:

- a first graphic symbol formed by two slope scales 7 and 8 for the take-off and wave-off maneuvers, inclined symmetrically along the arms of an X laid on an artificial skyline 3 and intersecting right on the aircraft model 2 at a point 9 corresponding to a pitch attitude value called a safety pitch attitude to be maintained in the event of engine failure,
- a second graphic symbol formed by two half straight lines 10 and 11 attached to the aircraft model 2 and parallel to the artificial skyline 3 forming a local horizontal reference, and
- a third graphic symbol constituted by two elongated and reclining U-shaped pointers 12 and 13 separated by the span of the two half straight lines 10 and 11 of the local skyline, having their apertures facing each other and placed at one and the same level above the artificial skyline 3 at a height corresponding to the safety pitch attitude at which the two wave-off and take-off slope scales 7 and 8 intersect.

Each of the wave-off and take-off slope scales 7 and 8 has a marker at every 2.5° of slope between the 0° attitude (the horizon) and +20°. This marker takes the form of two dashes joined to each other, one horizontal and parallel to the artificial skyline 3 and the other oblique along the slope line of the scale.

The distance between the markers of the two slope scales 7 and 8 for the take-off and wave-off maneuvers assigned to one and the same level develops linearly in a decreasing manner to converge along lower values or higher values on the safety pitch attitude to be maintained in the event of engine failure (13° in FIGS. 1 to 3). The effect of convergence is reinforced by the oblique wings of the reference marks. The difference between the reference marks at +2.5° on the two slope scales 7 and 8 for the take-off and wave-off maneuvers correspond to the distance between the two indicators 12 and 13 of the third graphic symbol identifying the safety pitch attitude.

The slope scales 7 and 8 for the take-off and wave-off maneuvers in the event of an interruption of approach procedures facilitate, in the event of an engine failure, the acquisition and then the holding of the safety attitude by means of an accurate perception of the speed of variation of the pitch attitude on the basis of the apparent speed at which their reference markers move past the aircraft model 2. Furthermore, they give precise information on pitch attitude by the referencing of the relative position of the aircraft model 2 with respect to their identification marks. They are totally compatible with the flight procedures used when there is no engine failure and are presented at each take-off or wave-off maneuver after the interruption of an approach.

The local horizon formed by the two half lines 10 and 11 attached to the aircraft model 2 and parallel to the artificial skyline 3 enables the pilot of the aircraft to control the roll attitude more efficiently when his attention is more particularly fixed on the vicinity of the aircraft model 2 far from the artificial skyline 3 which is the case during take-off or during a wave-off maneuver.

The local horizon 10, 11 is centered and rotates as a function of the roll attitude angle around the aircraft model symbol 2 which is fixed in terms of collimator axes. Associated with the slope scales 7 and 8 for the take-off and wave-off maneuvers which are attached to the artificial skyline 3, it makes it possible, along with the aircraft model 2, to estimate and check the pitch attitude and roll attitude angles.

The two indicators 12 and 13 of the third graphic symbol identifying the safety pitch attitude at which there intersects the two slope scales 7 and 8 of the take-off and wave-off maneuvers enable the pilot to get a clear view of the relative position of the two half straight lines 10 and 11 of the local horizon with respect to the safety pitch attitude.

Thus, grouped around the aircraft model 2, the pilot finds all the elements needed to appreciate the situation and deduce therefrom the actions needed to hold the aircraft in the flight domain required in the event of take-off or wave-off maneuvers. This provides an elegant solution to the problem of transition and changing of piloting reference (to-and-fro) between the ground speed vector 4 which enables an estimation of the orientation of the path of the aircraft and the aircraft model 2 which gives knowledge about the attitude of the aircraft. This transition, while it is done naturally during take-off without engine failure, is far more delicate to manage without this new symbology if, for example, an engine failure takes place during a wave-off operation interrupting an ILS (instrument landing system) approach.

For, at this moment, the aircraft is very close to the ground (less than 50 feet in the all-weather IIIB landing category) and engine failure may (in a twinengine aircraft for example) induce a fairly big lurch in terms of roll attitude and course, while the assumption of the pitch attitude must at the same time ensure a slope and hence a positive vertical speed.

Furthermore, in these critical stages of flight, the temporal aspect of the control of the aircraft by the crew becomes crucial and the advantages of the new symbology just described are that it increases the overall level of monitoring of the situation, improves the pilot's capacity of reaction and facilitates the necessary transitions among the centers of interest of the symbology. In particular, it enables the pilot, by using first of all the half lines 10 and 11 of the local horizon and then the take-off and wave-off slope scales 7 and 8, to:

- anticipate any changes in roll attitude close to the ground related for example to an engine failure,
- check the rate of rotation in pitch attitude
- anticipate the arrival at the safety pitch attitude in order to prevent oscillations and an excessive value of incidence,
- easily manage the transition from the ground speed vector 4 to the aircraft model 2 to stabilize the attitude of the aircraft, as well as the reverse transition when the roll attitude and the pitch attitude are stabilized to check the trajectory of the aircraft.

In the event of automatic wave-off when there is no engine failure, the pilot has to monitor the situation and ascertain that the pitch attitude rotation and the climb of the aircraft are really being performed normally by the automatic pilot. For this purpose, he checks the pitch attitude and the roll attitude by means of the new graphic symbols displayed.

For the checking of the pitch attitude, he must see the aircraft model symbol 2 rise towards the pointers 12, 13 identifying the safety pitch attitude and go beyond them to reach a pitch attitude greater than that recommended in the event of engine failure, with an appropriate speed of shift appreciated on the basis of the speed at which the slope scale markers 7 and 8 move past for the take-off and wave-off maneuvers.

For the checking of the roll attitude, the inclination of the local horizon 10, 11 with respect to the aircraft model 2 shows him the work performed by the automatic pilot around the roll axis.

For the other functions such as the checking of the trajectory in terms of slope and course and the checking of the domain of aerodynamic flight, the pilot uses the usual alphanumeric and graphic symbols. He must see the ground speed vector 4 rise above the artificial skyline 3, right on the set course.

In the event of manual wave-off following an alarm which may or may not be due to a failure of the automatic flight control system but follows an engine failure, the pilot must wait for the safety pitch attitude and check the roll attitude.

To achieve the safety pitch attitude, he uses the aircraft model 2 which must rise towards the indicators 12, 13 identifying the safety pitch attitude without going beyond them, with an appropriate speed appreciated by the moving past of the take-off and wave-off slope scale markers 7 and 8.

To check the roll attitude, he identifies his position by the inclination of the local horizon 10, 11 with respect to the aircraft model 2.

Should the pilot see the ground about the runway, he can also ensure the avoidance of obstacles, if any, by taking account of the relative position of the ground speed vector 4 with respect to these obstacles.

FIG. 1 has been plotted for an operational position corresponding to a climb at take-off with all engines operational. The aircraft flies at zero roll attitude, with its wings flat as shown by the half straight lines 10 and 11 of the local horizon which are perfectly aligned with the wings of the aircraft model 2. Its pitch attitude is greater than the safety pitch attitude to be maintained in the event of engine failure as identified by the indictors 12 and 13. Here it is +15.5° while the set value of safety pitch attitude is +13°. The relative position of the ground speed vector 4 with respect to the take-off and wave-off slope scales 7 and 8 shows that the aircraft is climbing along a positive slope of 5° The relative position of the "ground speed vector" symbol 4 with respect to the artificial skyline 3 and to its heading scale shows that the aircraft is following a course at 180 on this heading scale.

FIG. 2 has been drawn for an operational situation corresponding to a climbing maneuver in a situation of wave-off with engine failure. The aircraft is again flying at 0 roll attitude as indicated by the half lines 10 and 11 of the local horizon which are aligned with the wings of the aircraft model 2. However, its pitch attitude is now just equal to the safety pitch attitude for, beyond this it would no longer be able to maintain its set speed. The relative position of the ground speed vector 4 with respect to the take-off and wave-off slope scales 7 and 8 shows that the aircraft is climbing with a small but positive slope of 2°. The relative position of the ground speed vector 4 with respect to the artificial skyline 3 and to its heading scale shows that the aircraft is still following a course at 180 on this heading scale, albeit approximately.

This FIG. 2 shows a new graphic symbol 14 that appears only when the aircraft is in a flight configuration close to stalling. This new graphic symbol 14 is formed by a straight-line segment identifying a limit angle of slope that the speed vector must not cross if it is to avoid stalling. This graphic symbol 14 shows that the aircraft is flying in a marginal aerodynamic configuration, at about 2.5° from its stalling incidence.

FIG. 3 has been drawn for an operational situation similar to that of FIG. 1, corresponding to a climbing maneuver at take-off with all engines operational and the commencement of a rightward turn. The aircraft is flying with a rightward roll attitude. This is shown by the leftward inclination of the two half straight lines 10 and 11 of the local horizon with respect to the wings of the aircraft model 2 and more generally the leftward inclination of the artificial skyline 3 as well as of the take-off and wave-off slope scales 7 and 8 and of the indicators 12 and 13 identifying the safety pitch attitude which are linked to the artificial skyline 3. Its pitch attitude is greater than the safety pitch attitude. Here, as in FIG. 1, it is equal to +15.5° while the safety pitch attitude is +13°. The relative position of the ground speed vector 4 with respect to the take-off and wave-off slope scales 7 and 8 shows that the aircraft is climbing along a positive slope of 5°. The relative position of the ground speed vector with respect to the artificial skyline 3 and its heading scale shows that the aircraft is following an instantaneous course at 192 on this heading scale. The fact that the figure is fixed means that it is not possible to show the leftward shift of the heading scale on the artificial skyline 3 following the operation to place the aircraft in a rightward turn.

Figure 4:
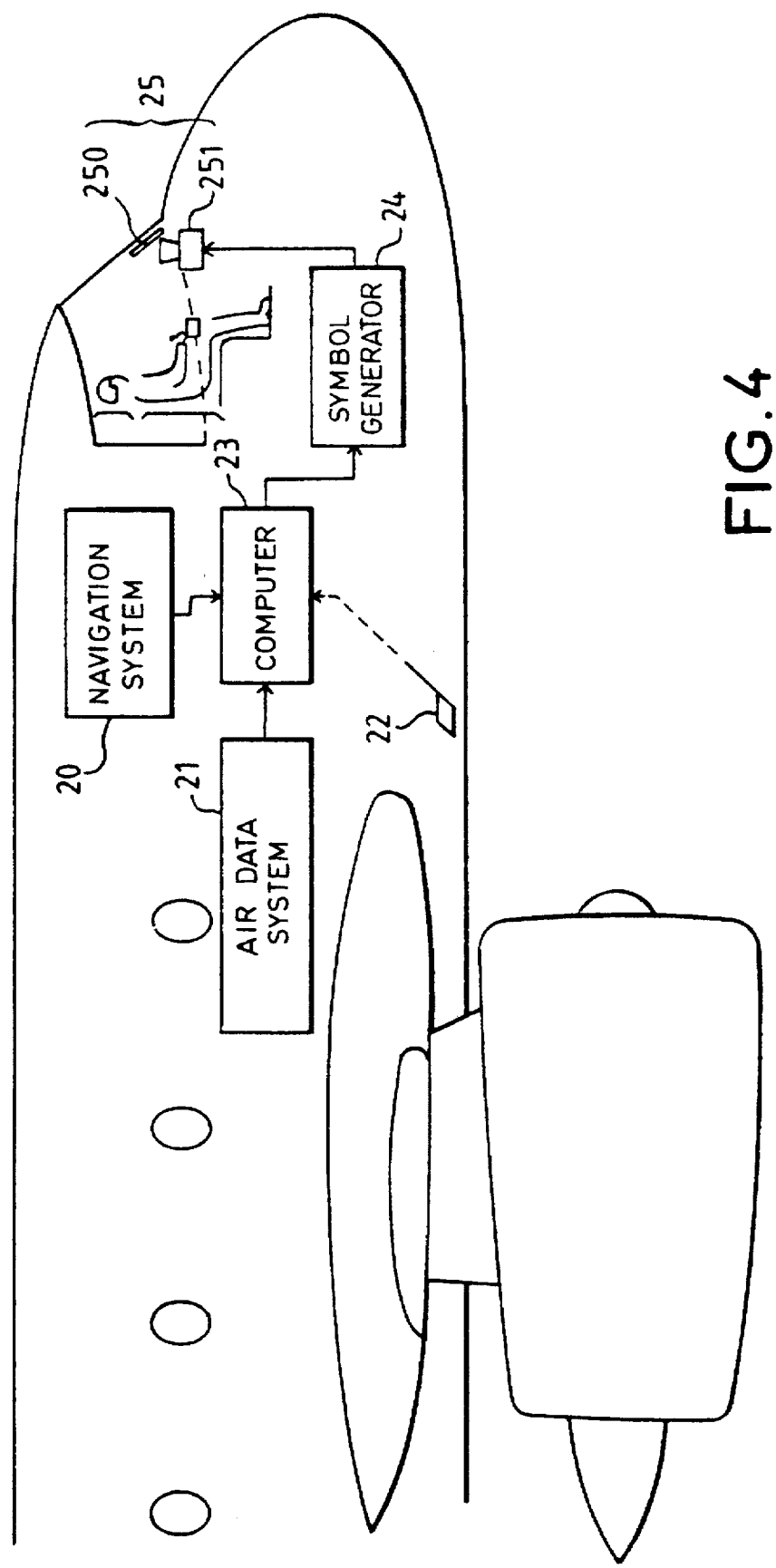
FIG. 4 is a diagram illustrating the general architecture of a device according to the invention on board an aircraft.

FIG. 4 shows the general architecture of a piece of equipment installed on board an aircraft to display the graphic symbols of FIGS. 1 to 3 before the pilot's eyes. The aircraft, of which it is possible to see the front part with the cockpit, is fitted out with a navigation system 20 and an air data measurement system with an air data system 21 and an incidence probe 22 that are connected by a computer 23 and a symbol generator 24 to a collimator 25.

The navigation system 20 gives the usual indications including, in particular, the heading, the ground speed vector, the pitch attitude and the roll attitude.

The collimator 25 has a transparent screen 250 that is placed before the pilot's eyes, superimposed over the outside scene, on which the projection device 251 displays the different alphanumeric and graphic symbols pertaining to piloting, including those shown in FIGS. 1 to 3.

The projection device 251 is guided by the symbol generator 24 which receives the updating commands from the programmed logic computer 23 connected to the navigation system 20 and to the air data measurement system 21, 22.

What is claimed is:

1. An optoelectronic device for assistance in the piloting of an aircraft provided with a navigation system defining inter alia the pitch and roll attitudes wherein said device comprises a collimator displaying an artificial skyline given a roll attitude reference and a zero slope and a fixed symbol constituted by an aircraft model giving a longitudinal reference of the aircraft, and means for displaying, on the collimator, two slope scales which give precise information on pitch attitude during take-off maneuvers and wave-off maneuvers, inclined symmetrically along the arms of an X laid on the artificial skyline and intersecting at a value of pitch attitude called a safety pitch attitude to be maintained in the event of engine failure.

2. A device according to claim 1, further comprising means for the display, on the collimator, of a local horizon locked into the fixed symbol of the aircraft model.

3. A device according to claim 2 further comprising means for the display, on the collimator, of two indicators that identify the safety pitch attitude and are a fixed distance apart and parallel to the artificial skyline, positioned on each side of the aircraft model at the level of the safety pitch attitude and designed to be positioned on the local horizon when the pitch attitude of the aircraft is the same as the safety pitch attitude.

4. A device according to claim 1, wherein the two slope scales are graduated at every 2.5 degrees of slope.

5. A device according to claim 1, wherein the two slope scales extend over 20 degrees of slope above the artificial skyline.

6. A device according to claim 1, wherein markers of each slope scale are formed by two dashes joined to each other, one horizontal and parallel to the artificial skyline and the other oblique along the slope line of the scale.

7. A device according to claim 2, wherein the display of a local horizon includes two aligned straight-line segments that are symmetrical with respect to the center of the aircraft model symbol and parallel to the artificial skyline.

8. A device according to claim 3, wherein the means for the display of the two indicators achieve the display, on the collimator, of two indicators spaced out laterally by the length of the two straight-line segments of the local horizon.

9. A device according to claim 3, wherein the means for the display of the two indicators achieve the display, on the collimator, of two elongated and reclining U-shaped pointers having their apertures facing each other and placed at one and the same level above the artificial skyline at a height corresponding to the safety pitch attitude at which the two slope scales intersect.

10. A device according to claims 8 or 9, wherein the two indicators identifying the safety pitch attitude surround external ends of the local horizon when the pitch attitude of the aircraft corresponds to the safety pitch attitude.

* * * * *